(12) United States Patent
Shih et al.

(10) Patent No.: US 10,394,518 B2
(45) Date of Patent: Aug. 27, 2019

(54) AUDIO SYNCHRONIZATION METHOD AND ASSOCIATED ELECTRONIC DEVICE

(71) Applicant: MEDIATEK INC., Hsin-Chu (TW)

(72) Inventors: Xin-Wei Shih, Changhua County (TW); Chia-Ying Li, Taipei (TW); Chao-Ling Hsu, Hsinchu (TW); Yiou-Wen Cheng, Hsinchu (TW); Shen-Kai Chang, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 184 days.

(21) Appl. No.: 15/450,005

(22) Filed: Mar. 5, 2017

(65) Prior Publication Data
US 2017/0262255 A1 Sep. 14, 2017

Related U.S. Application Data

(60) Provisional application No. 62/306,112, filed on Mar. 10, 2016.

(51) Int. Cl.
| | |
|---|---|
| *G06F 17/00* | (2019.01) |
| *G06F 3/16* | (2006.01) |
| *G11B 20/10* | (2006.01) |
| *G11B 27/10* | (2006.01) |
| *H04R 29/00* | (2006.01) |

(52) U.S. Cl.
CPC ........ *G06F 3/165* (2013.01); *G11B 20/10527* (2013.01); *G11B 27/10* (2013.01); *H04R 29/006* (2013.01); *G11B 2020/10546* (2013.01); *H04S 2400/15* (2013.01)

(58) Field of Classification Search
CPC ... G06F 3/165; G11B 20/10527; G11B 27/10; G11B 2020/10546; H04R 29/006; H04S 2400/15
See application file for complete search history.

(56) References Cited

U.S. PATENT DOCUMENTS

| | | | | |
|---|---|---|---|---|
| 8,494,190 B2 * | 7/2013 | Sakai | ...................... | H04S 7/301 381/300 |
| 9,319,782 B1 * | 4/2016 | Crump | ...................... | H04R 3/02 |
| 2004/0223553 A1 * | 11/2004 | Kumar | .................. | H04L 1/0059 375/259 |
| 2009/0225996 A1 * | 9/2009 | Brooking | ................. | H04R 3/04 381/59 |
| 2014/0294201 A1 | 10/2014 | Johnson | | |

FOREIGN PATENT DOCUMENTS

JP 2015-22044 A 2/2015

* cited by examiner

*Primary Examiner* — Fan S Tsang
*Assistant Examiner* — David Siegel
(74) *Attorney, Agent, or Firm* — Winston Hsu

(57) ABSTRACT

An audio synchronization method includes: receiving a first audio signal from a first recording device; receiving a second audio signal from a second recording device; performing a correlation operation upon the first audio signal and the second audio signal to align a first pattern of the first audio signal and the first pattern of the second audio signal; after the first patterns of the first audio signal and the second audio signal are aligned, calculating a difference between a second pattern of the first audio signal and the second pattern of the second audio signal; and obtaining a starting-time difference between the first audio signal and the second audio signal for audio synchronization according to the difference between the second pattern of the first audio signal and the second pattern of the second audio signal.

17 Claims, 14 Drawing Sheets

AUDIO SYNCHRONIZATION METHOD AND ASSOCIATED ELECTRONIC DEVICE

CROSS REFERENCE TO RELATED APPLICATIONS

This application claims the priority of U.S. Provisional Application No. 62/306,112, filed on Mar. 10, 2016, which is included herein by reference in its entirety.

BACKGROUND

In a 360-degree audio/video application, a plurality of cameras and microphones are used to record audio and video tracks for use of virtual reality. When a user wears a head-mounted display or a headphone to enjoy the virtual reality, the recorded audio and video tracks can be played by the head-mounted display or the headphone to provide an immersive experience to the user. However, because the audio tracks are recorded by two or more microphones, and starting-time of microphones (i.e. time points that the microphones start to record) are always different due to the internal hardware or software situations, the audio tracks may not be intrinsically synchronized.

SUMMARY

It is therefore an objective of the present invention to provide an audio synchronization method, which can exactly determine the starting-time difference between the audio tracks, to solve the above-mentioned problems.

According to one embodiment of the present invention, an audio synchronization method comprises: receiving a first audio signal from a first recording device; receiving a second audio signal from a second recording device; performing a correlation operation upon the first audio signal and the second audio signal to align a first pattern of the first audio signal and the first pattern of the second audio signal; after the first patterns of the first audio signal and the second audio signal are aligned, calculating a difference between a second pattern of the first audio signal and the second pattern of the second audio signal; and obtaining a starting-time difference between the first audio signal and the second audio signal for audio synchronization according to the difference between the second pattern of the first audio signal and the second pattern of the second audio signal.

According to another embodiment of the present invention, an audio synchronization method comprises: controlling a first speaker to play a sound having a first pattern; controlling a second speaker to play a sound having a second pattern; receiving a first audio signal from a first recording device that records the sounds generated by the first speaker and the second speaker; receiving a second audio signal from a second recording device that records the sounds generated by the first speaker and the second speaker; referring to time points of the first pattern and the second pattern within the first audio signal and time points of the first pattern and the second pattern within the second audio signal to obtain a starting-time difference between the first audio signal and the second audio signal for audio synchronization.

According to another embodiment of the present invention, an electronic device comprises a processing circuit. The processing circuit is arranged for receiving a first audio signal and a second audio signal from a first recording device and a second recording device, respectively, and performing a correlation operation upon the first audio signal and the second audio signal to align a first pattern of the first audio signal and the first pattern of the second audio signal; and after the first patterns of the first audio signal and the second audio signal are aligned, calculating a difference between a second pattern of the first audio signal and the second pattern of the second audio signal; and obtaining a starting-time difference between the first audio signal and the second audio signal for audio synchronization according to the difference between the second pattern of the first audio signal and the second pattern of the second audio signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
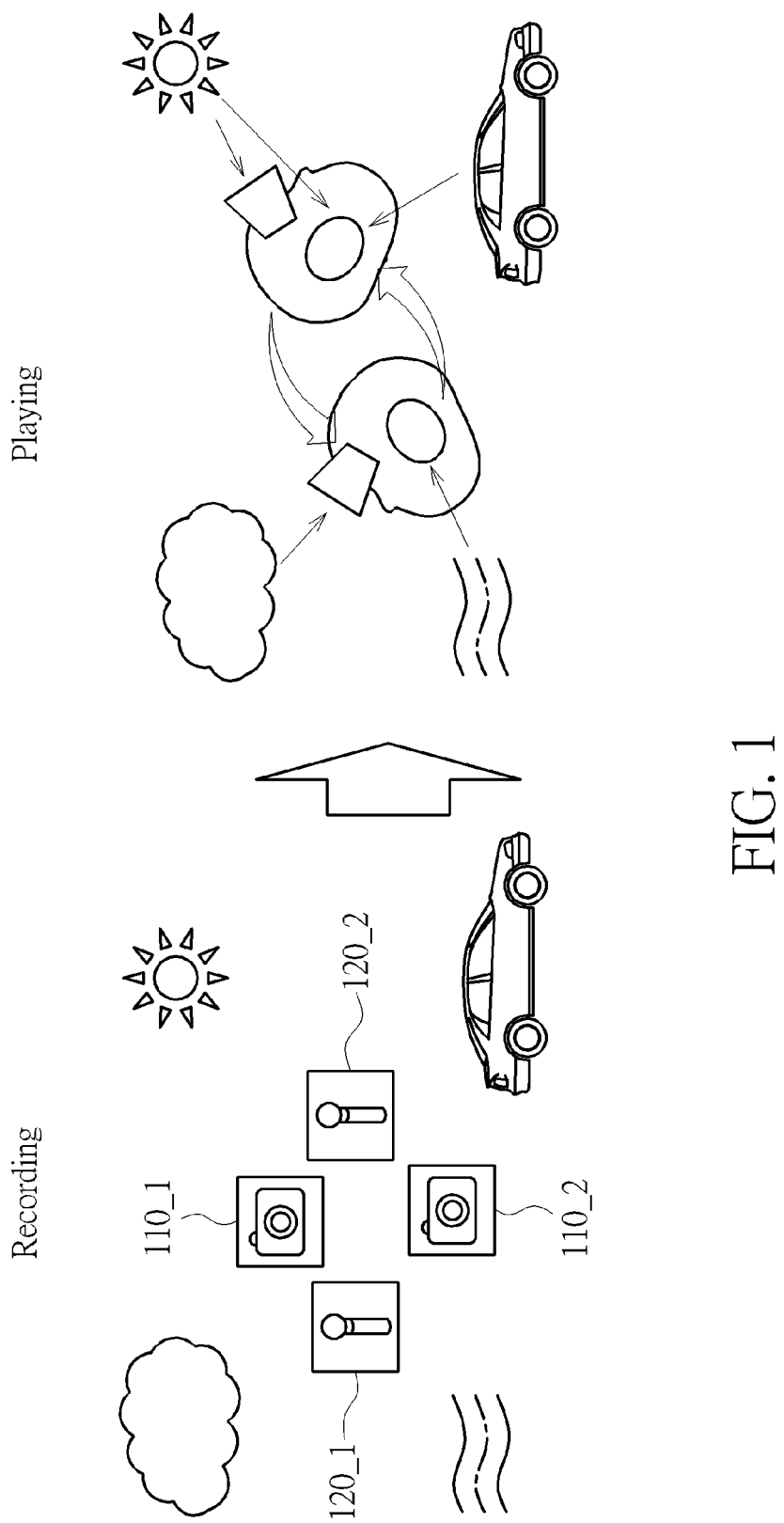
FIG. 1 is a diagram illustrating 360-degree audio/video application.

The embodiments of the audio synchronization method of the present invention are used to determine a starting-time difference between two microphones (i.e. difference between time points that the microphones start to record the audio signals), and to use the determined starting-time difference to synchronize the recorded audio signals. In addition, the embodiments of the audio synchronization method can be applied to a 360-degree audio/video application as shown in FIG. 1, where a plurality of cameras 110_1 and 110_2 and microphones 120_1 and 120_2 are used to record audio and video signals for use of virtual reality.

Figure 2:
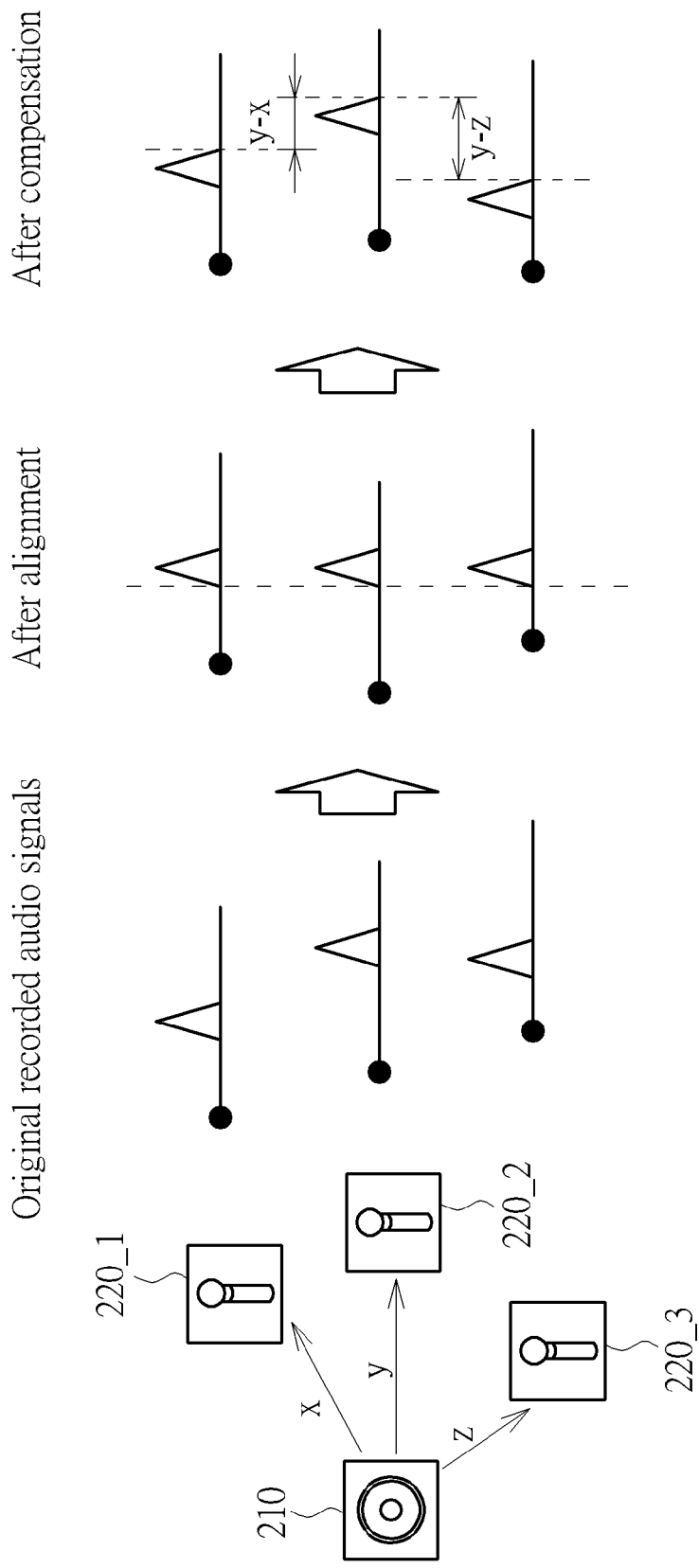
FIG. 2 is a diagram illustrating an audio synchronization method according to one embodiment of the present invention.

Please refer to FIG. 2, which is a diagram illustrating an audio synchronization method according to one embodiment of the present invention. As shown in FIG. 2, it is assumed that three microphones 220_1-220_3 are used to record the audio signals, and a speaker 210 is used to generate a synchronization sound pattern for audio synchronization. The synchronization sound pattern can be any pre-designed sound pattern that is capable of being differentiated from the environment noise, and the synchronization sound pattern may have single tone, sweep tone or chirps, and the synchronization sound pattern may be normal sound or ultra-sound. In this embodiment, a position of the speaker 210 is determined by a user or a product engineer, so distances between the speaker 210 and the microphones 220_1-220_3 are known by the user or the engineer, where the distances between the speaker 210 and the microphones 220_1-220_3 are represented by "x", "y" and "z", respectively, and it is assumed that y>x>z. In the beginning, the user enables the microphones 220_1-220_3 to start to record the audio signals, respectively, then the speaker 210 generates the synchronization sound pattern, where the black spots shown in FIG. 2 are the starting-times that the microphones 220_1-220_3 start to record the audio signal, and triangular waves shown in FIG. 2 represent the synchronization sound patterns recorded by the microphones 220_1-220_3.

After receiving the original recorded audio signals, an auto-correlation operation is performed upon the original recorded audio signals to align the synchronization sound patterns within the original recorded audio signals. Then, because the device/microphone specifications and placements are known, the sound delays corresponding to the distance difference "y-x" and "y-z" cane be pre-calculated, and the sound delays corresponding to the distance difference "y-x" and "y-z" are applied to compensate the aligned audio signals to generate the compensated audio signals. In the compensated audio signals shown in FIG. 2, the synchronization sound patterns of the compensated audio signals corresponding to the microphones 220_1 and 220_2 have the delay corresponding to the distance difference "y-x", and the synchronization sound patterns of the compensated audio signals corresponding to the microphones 220_2 and 220_3 have the delay corresponding to the distance difference "y-z", and these compensated audio signals serve as the synchronized audio signals that the starting-time difference situations are compensated.

Figure 3:
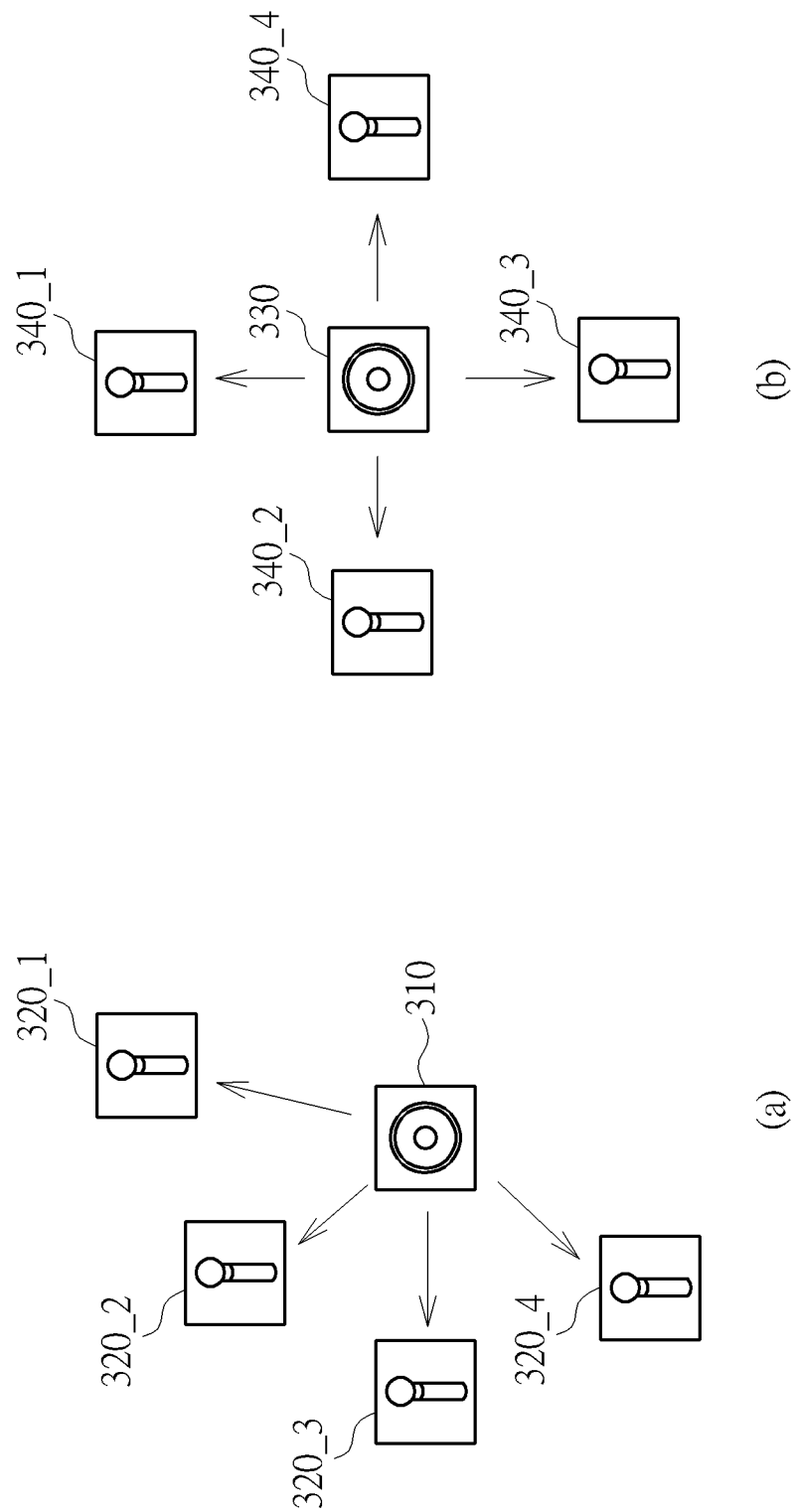
FIG. 3 is a diagram illustrating an audio synchronization method according to another embodiment of the present invention.

In the embodiment shown in FIG. 2, the sound delays need to be pre-calculated to compensate the audio signals, however, the sound delay calculation may be influenced by the sound speed that is determined by the environment temperature, humidity and air density. Therefore, delay errors may be introduced to affect the accuracy of the compensated audio signals. To solve the delay errors issue, one solution is provided to make the speaker and the microphones have a special arrangement such as ring or symmetrical placements as shown in FIG. 3 (a) and FIG. 3 (b). Referring to FIG. 3 (a) and FIG. 3 (b), distances between a speaker 310/330 and each of microphones 320_1-320_4/340_1-340_4 are the same, so the sound propagation delays between the speaker 310/330 and each of microphones 320_1-320_4/340_1-340_4 are identical to prevent the sound delay issue in the embodiment of FIG. 2.

In the embodiment shown in FIG. 3, finding feasible positions for the speaker 310/330 may be difficult, and furthermore, if some objects exist between the speaker 310/330 and each of microphones 320_1-320_4/340_1-340_4, the objects may shape the sound propagation paths from direct line into zigzags, and the zigzags may not be identical, therefore, the sound propagation delays may not be identical even though the distances between the speaker 310/330 and each of microphones 320_1-320_4/340_1-340_4 are the same. To solve these problems, one embodiment shown in FIG. 4 is provided.

Figure 4:
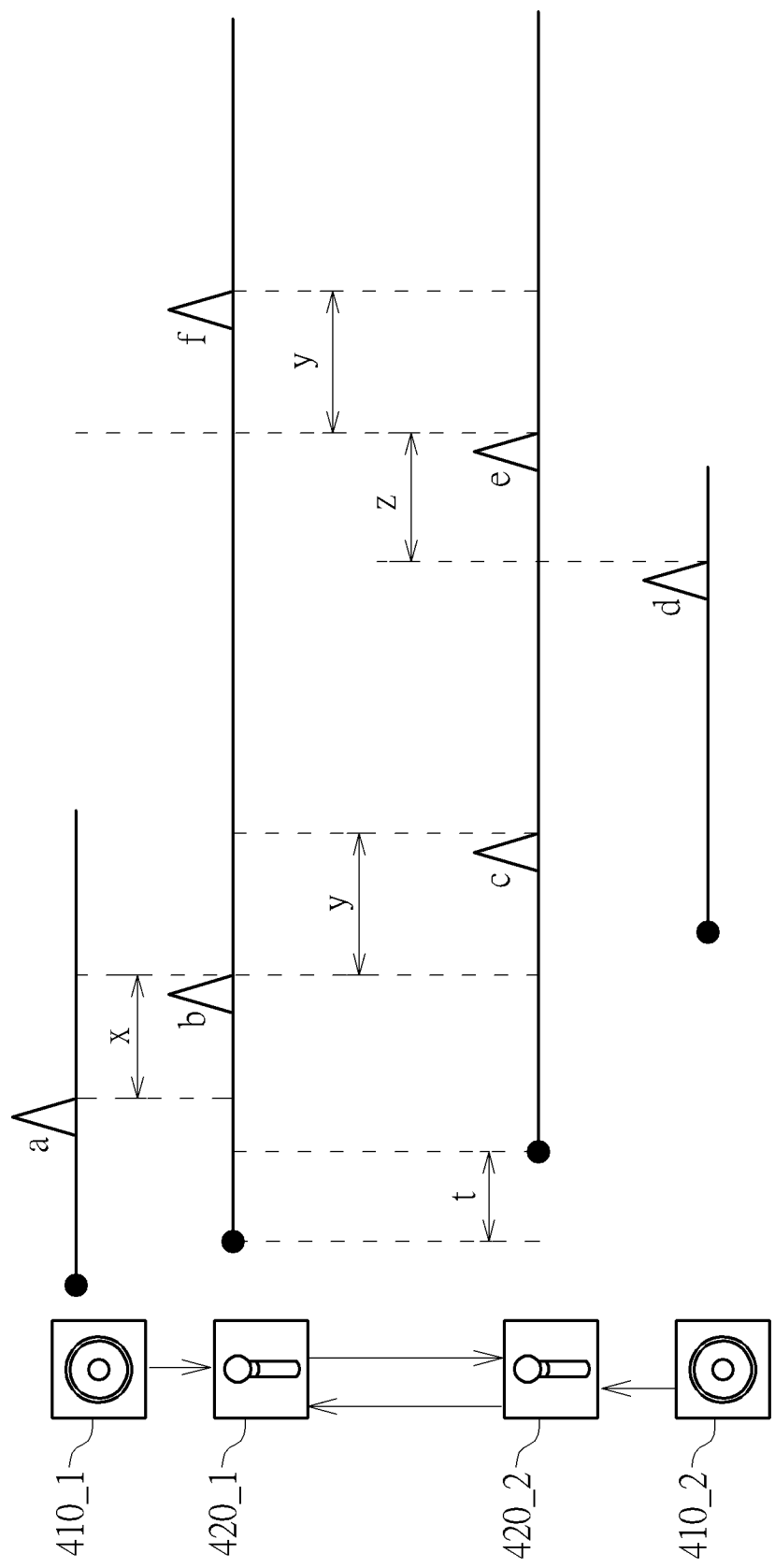
FIG. 4 and FIG. 5 is a diagram illustrating an audio synchronization method according to another embodiment of the present invention.

FIG. 4 is a diagram illustrating an audio synchronization method according to another embodiment of the present invention. As shown in FIG. 4, it is assumed that two microphones 420_1 and 420_2 are used to record the audio signals, and two speaker 410_1 and 410_2 are used to generate synchronization sound patterns for audio synchronization. The synchronization sound patterns generated by the speaker 410_1 and 410_2 may be the same or different, and the synchronization sound pattern can be any pre-designed sound pattern that is capable of being differentiated from the environment noise, and the synchronization sound pattern may have single tone, sweep tone or chirps, and the synchronization sound pattern may be normal sound or ultra-sound. In this embodiment, the speaker 410_1, the microphone 420_1, the microphone 420_2 and the speaker 410_1 are aligned at the same line, the microphones 420_1 and 420_2 are placed between the speakers 410_1 and 410_2, and the speaker 410_1 is placed closer to the microphone 420_1 than it is to the microphone 420_2, and the speaker 410_2 is placed closer to the microphone 420_2 than it is to the microphone 420_1.

In the beginning, the user enables the microphones 420_1 and 420_2 to start to record the audio signals, respectively, and the user controls the speaker 410_1 to generate a first synchronization sound pattern, where the black spots shown in FIG. 4 are the starting-times that the microphones 420_1 and 420_2 start to record the audio signals, and a triangular wave "a" represents the first synchronization sound pattern generated by the speaker 410_1, and the triangular waves "b" and "c" represent the first synchronization sound patterns recorded by the microphones 420_1 and 420_2, respectively. Then, after a while, the user controls the speaker 410_2 to generate a second synchronization sound pattern, where a triangular wave "d" represents the second synchronization sound pattern generated by the speaker 410_2, and the triangular waves "e" and "f" represent the second synchronization sound pattern recorded by the microphones 420_2 and 420_1, respectively.

In the embodiment shown in FIG. 4, the symbol "t" represents the starting-time difference between the two microphones 420_1 and 420_2, the symbol "x" represents the sound propagation delay between the first synchronization sound patterns "a" and "b", the symbol "z" represents the sound propagation delay between the second synchronization sound patterns "d" and "e", and the symbol "y" represents the sound propagation delay between the two microphones 420_1 and 420_2 (i.e. the sound propagation delay between the first synchronization sound patterns "b"

and "c", and/or the sound propagation delay between the second synchronization sound patterns "e" and "f"). It should be noted that starting-time difference "t" and the sound propagation delay "x", "y" and "z" are initially unknown.

Figure 5:
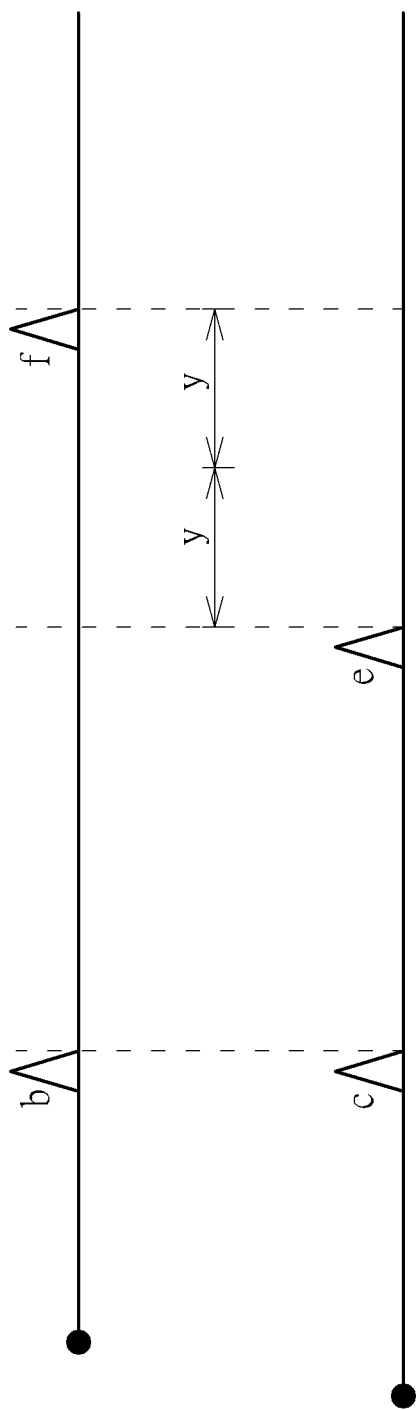

In order to obtain the starting-time difference "t" to compensate the recorded audio signals, referring to FIG. 5, the correlation operation is performed upon the audio signals recorded by the microphones 420_1 and 420_2 to align the first synchronization sound patterns "b" and "c". After the first synchronization sound patterns "b" and "c" are aligned, a difference between the second synchronization sound pattern "e" of the audio signal recorded by the microphone 420_2 and the second synchronization sound pattern "f" of the audio signal recorded by the microphone 420_1 is calculated, where the difference is equal to "2*y" (exactly "2*y"). Then, the sound propagation delay "y" between the two microphones 420_1 and 420_2 is obtained according to the calculated difference "2*y" between the second synchronization sound patterns "e" and "f". Then, the audio signal(s) are moved to make the first synchronization sound pattern "b" of the audio signal recorded by the microphone 420_1 and the first synchronization sound pattern "c" of the audio signal recorded by the microphone 420_2 have the delay "y" as shown in FIG. 4. Finally, a head position of the (moved) audio signal recorded by the microphone 420_1 and a head position of the (moved) audio signal recorded by the microphone 420_2 are compared to obtain the starting-time difference "t" for audio synchronization. For example, the audio signal recorded by the microphone 4202 may add the dummy patterns whose length is equal to "t" at the beginning for audio synchronization.

In the embodiment shown in FIG. 4, the sound propagation delays "x" and "z" are not involved in the signal processing, that is the distance between the speaker 410_1 and the microphone 420_1 and the distance between the speaker 410_2 and the microphone 420_2 are not the restrictions for the audio synchronization method of this embodiment. In addition, by putting the speakers 410_1 and 410_2 at the extension line between the microphones 420_1 and 420_2, the sound propagation delays between the microphones 420_1 and 420_2 for two different propagation directions are identical, therefore, it's no need to consider or calibrate the sound speed for any path. In light of above, as long as the microphone 420_1, the microphone 420_2, the speaker 410_1 and the speaker 410_2 are aligned at the same line, the speaker 410_1 is placed closer to the microphone 420_1 than it is to the microphone 420_2, and the speaker 410_2 is placed closer to the microphone 420_2 than it is to the microphone 420_1, there is no restriction to the positions of the speakers 410_1 and 410_2 and the microphones 420_1 and 420_2.

Figure 6:
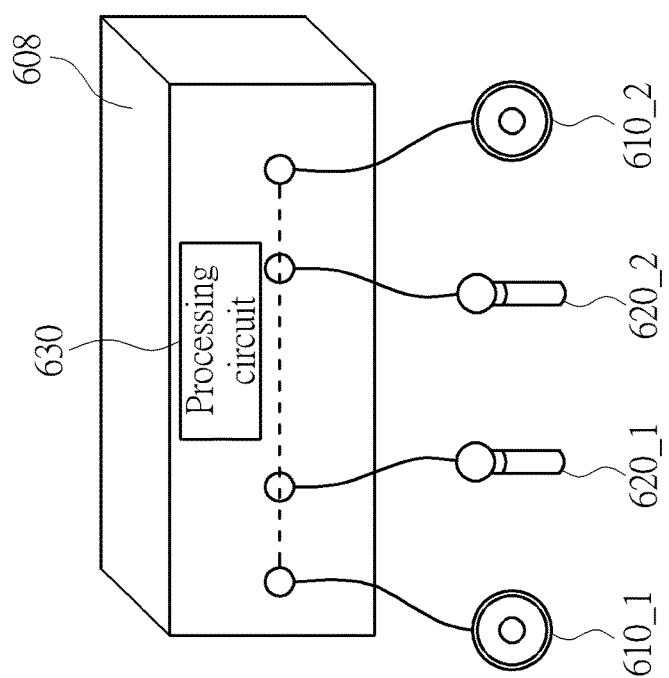
FIG. 6 shows an electronic device capable of recording two audio signals for 360-degree audio application according to one embodiment of the present invention.

FIG. 6 shows an electronic device 608 capable of recording two audio signals for 360-degree audio application according to one embodiment of the present invention. As shown in FIG. 6, the electronic device 608 comprises two speakers 610_1 and 610_2, two microphones 620_1 and 620_2 and a processing circuit 630. In this embodiment, the speakers 610_1 and 610_2 and microphones 620_1 and 620_2 are aligned at the same line, the microphones 620_1 and 620_2 are placed between the speakers 610_1 and 610_2, and the speaker 610_1 is placed closer to the microphone 620_1 than it is to the microphone 620_2, and the speaker 610_2 is placed closer to the microphone 620_2 than it is to the microphone 620_1. In addition, the electronic device 608 can be any portable device such as a smart phone or a tablet having more than one speaker and more than one microphone, but it is not a limitation of the present invention. The operations of the elements within the electronic device 608 are similar to the embodiment shown in FIGS. 4 and 5, and the detailed operations are in the following FIG. 8.

Figure 7:
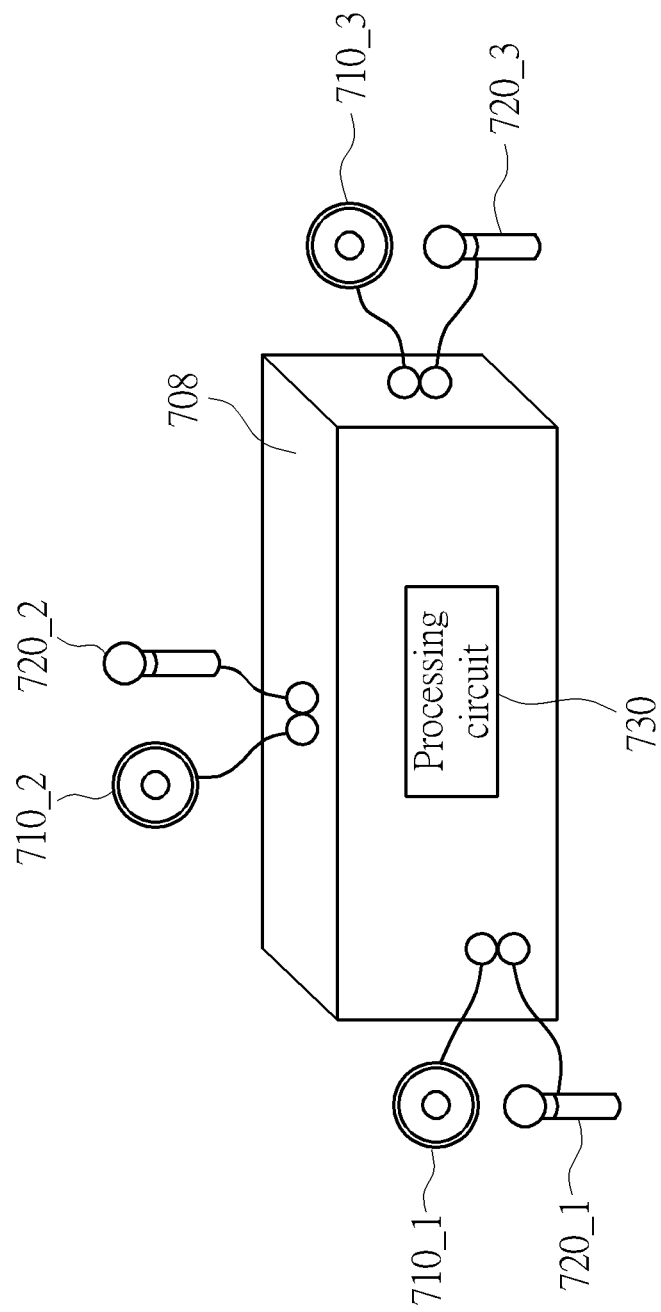
FIG. 7 shows an electronic device capable of recording audio signals for 360-degree audio application according to another embodiment of the present invention.

FIG. 7 shows an electronic device 708 capable of recording audio signals for 360-degree audio application according to another embodiment of the present invention. As shown in FIG. 7, the electronic device 708 comprises three speakers 710_1-710_3, three microphones 720_1-720_3 and a processing circuit 730. In this embodiment, the speaker 710_1 is placed very close to the microphone 720_1, the speaker 710_2 is placed very close to the microphone 720_2, and the speaker 710_3 is placed very close to the microphone 720_3, so every two of the speakers 710_1-710_3 and the corresponding two microphones are deemed to be at the same line. In addition, the electronic device 708 can be any portable device such as a smart phone or a tablet having more than one speaker and more than one microphone, but it is not a limitation of the present invention. The operations of the elements within the electronic device 708 are similar to the embodiment shown in FIGS. 4 and 5, and the detailed operations are in the following FIG. 8.

Figure 8:
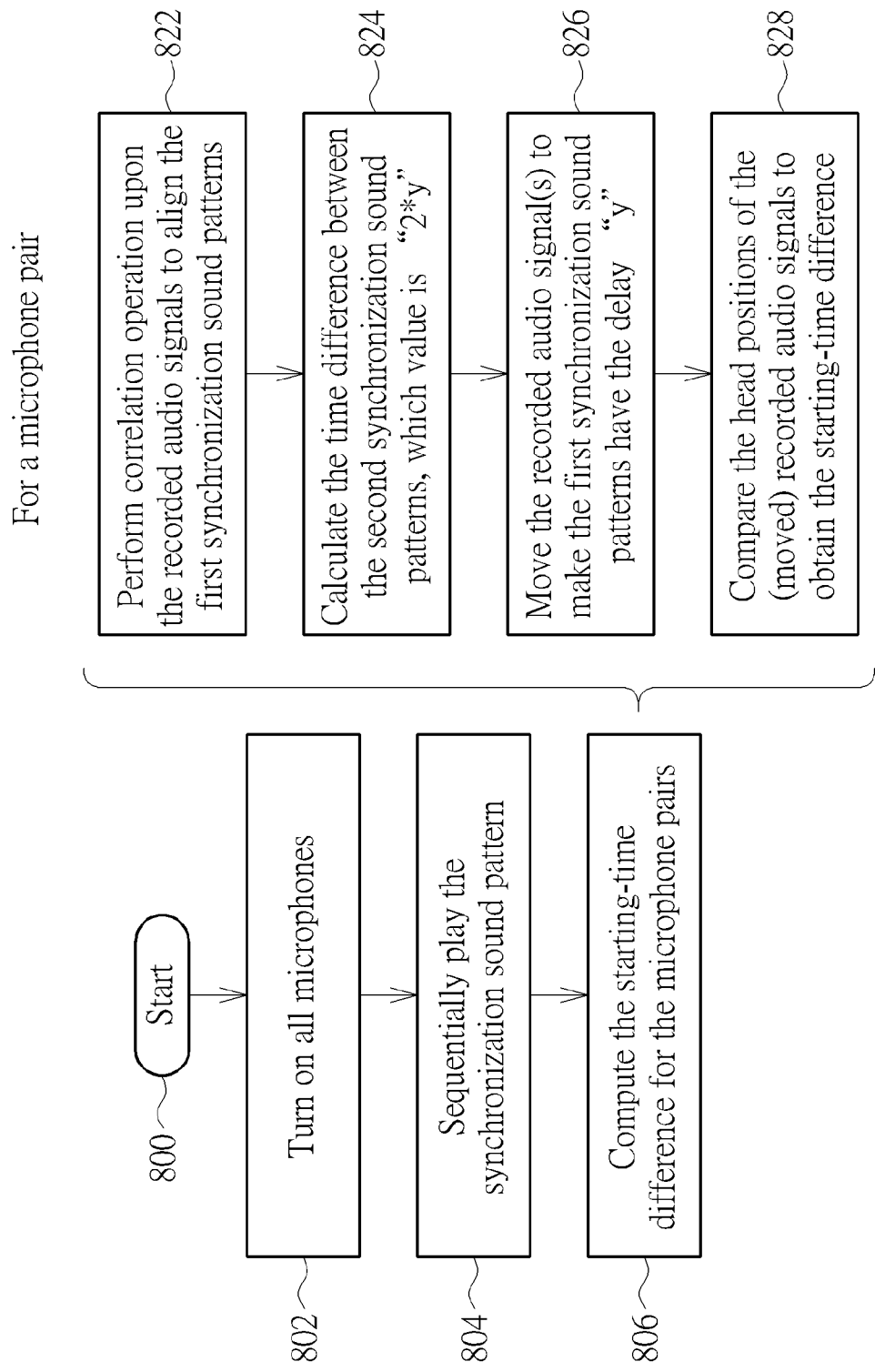
FIG. 8 is a flowchart of an audio synchronization method according to one embodiment of the present invention.

FIG. 8 is a flowchart of an audio synchronization method according to one embodiment of the present invention. In Step 800, the flow starts. In Step 802, the processing circuit 630/730 turns on all of the microphones 620_1-620_2/ 720_1-720_3. In Step 804, the processing circuit 630/730 controls the speakers 610_1-610_2/710_1-710_3 to sequentially play the synchronization sound patterns. In Step 806, the processing circuit 630/730 receives the audio signals from the microphones 620_1-620_2/720_1-720_3, and further computes the starting-time differences for the microphones, for example, the processing circuit 730 may compute the starting-time difference between the microphones 720_1 and 720_2, and further computes the starting-time difference between the microphones 720_2 and 720_3 to obtain the starting-time differences for all of the microphones 720_1-720_3; or the processing circuit 730 may compute the starting-time difference between the microphones 720_1 and 720_2, and further computes the starting-time difference between the microphones 720_1 and 720_3 to obtain the starting-time differences for all of the microphones 720_1-720_3.

Steps 822-828 are detailed flow of the starting-time difference calculation for a microphone pair. Taking the microphones 720_1 and 720_2 as the example, in Step 822, the processing circuit 730 performs the correlation operation upon the audio signals recorded by the microphones 720_1 and 720_2 to align the first synchronization sound patterns generated by the speaker 710_1. In Step 824, after the first synchronization sound patterns are aligned, the processing circuit 730 calculates a time difference between a second synchronization sound pattern of the audio signal recorded by the microphone 720_2 and the second synchronization sound pattern of the audio signal recorded by the microphone 720_1, wherein the second synchronization sound pattern is generated by the speaker 710_2, and a value of the difference is "2*y" (e.g. FIG. 5). In Step 826, the processing circuit 730 moves the audio signal(s) to make the first synchronization sound pattern of the audio signal recorded by the microphone 720_1 and the first synchronization sound pattern of the audio signal recorded by the microphone 720_2 have the delay "y" (e.g. FIG. 4). In Step 828, the processing circuit 730 compares a head position of the (moved) audio signal recorded by the microphone 720_1 and a head position of the (moved) audio signal recorded by the microphone 720_2 to obtain the starting-time difference (e.g. "t" shown in FIG. 4) for audio synchronization. For example, the audio signal recorded by the microphone 720_1 or 720_2 (e.g. the one that opens later) may add the dummy patterns whose length is equal to the starting-time difference at the beginning for audio synchronization.

It is noted that the embodiment shown in FIG. 7 may have more than three microphone-speaker pairs, and a plurality of starting-time difference calculations are performed on many two of the microphone-speaker pairs to obtain the starting-time information for all of the microphones. For example, if the electronic device 708 comprises a plurality of speakers 710_1-710_N and a plurality of microphones 720_1-720_N, the starting-time differences for microphones (720_1, 720_2), (720_1, 720_3), (720_1, 720_4), . . . , and (720_1, 720_N) can be calculated, or microphones (720_1, 720_2), (720_2, 720_3), (720_3, 720_4), . . . , and (720_(N−1), 720_N) can be calculated, to obtain the starting-time information for all of the microphones. As long as the starting-time difference calculations form a chain for all of the microphones 720_1-720_N, it is no restriction for the selection of the pair order.

Figure 9:
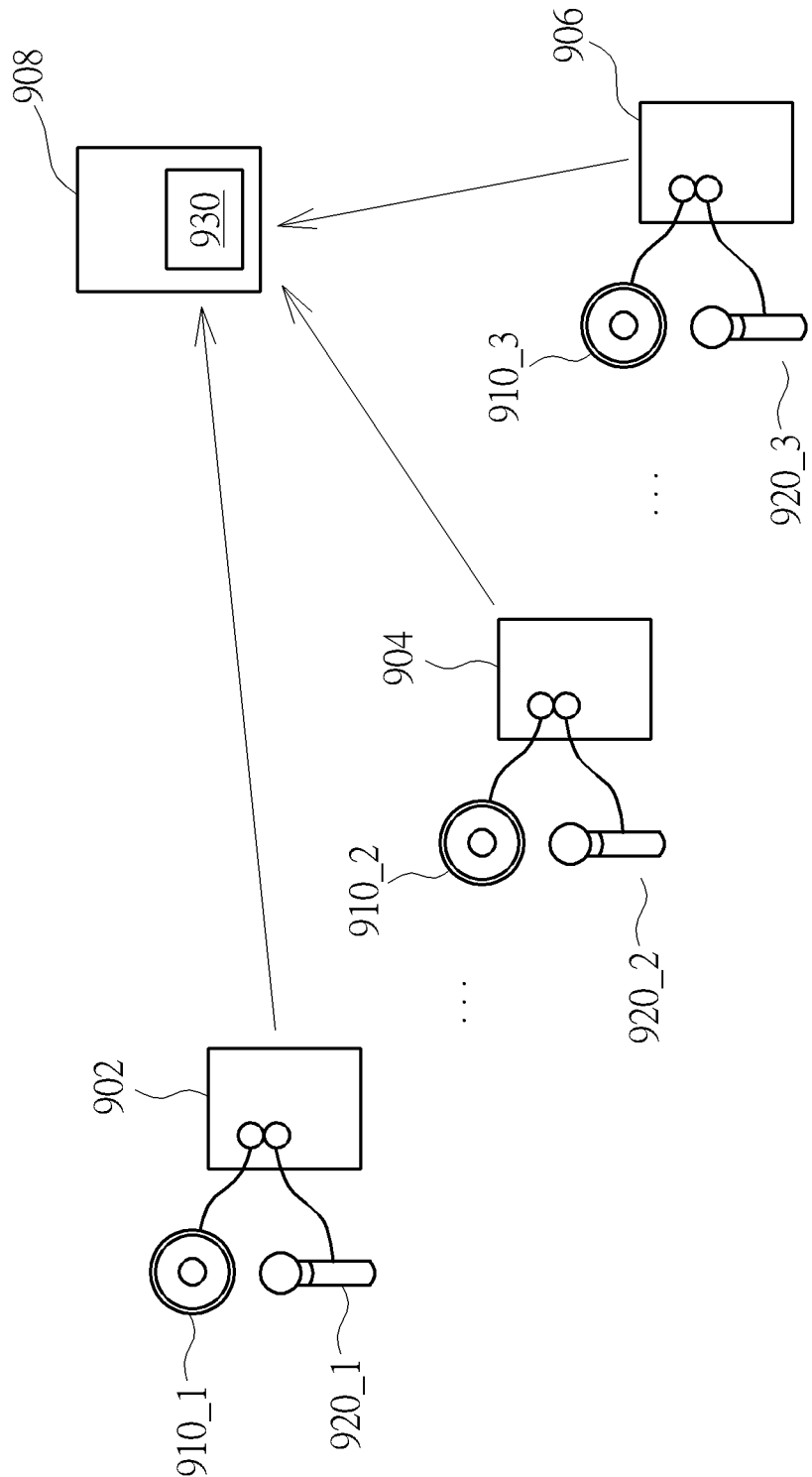
FIG. 9 is a system capable of recording audio signals for 360-degree audio application according to one embodiment of the present invention.

FIG. 9 is a system capable of recording audio signals for 360-degree audio application according to one embodiment of the present invention. As shown in FIG. 9, the system comprises four electronic devices 902, 904, 906 and 908, where the electronic device 902 comprises a speaker 910_1 and a microphone 920_1, the electronic device 904 comprises a speaker 910_2 and a microphone 920_2, the electronic device 906 comprises a speaker 910_3 and a microphone 920_3, and the electronic device 908 comprises a processing circuit 930. In this embodiment, the speaker 910_1 is placed very close to the microphone 920_1, the speaker 910_2 is placed very close to the microphone 920_2, and the speaker 910_3 is placed very close to the microphone 920_3, so every two of the speakers 910_1-910_3 and the corresponding two microphones are deemed to be at the same line. In addition, the electronic device 902, 904 and 906 can be any portable device such as a smart phone or a tablet having a speaker and a microphone, and the electronic device 908 can be a recording device, a remote controller or a cloud server device, but it is not a limitation of the present invention.

Figure 10:
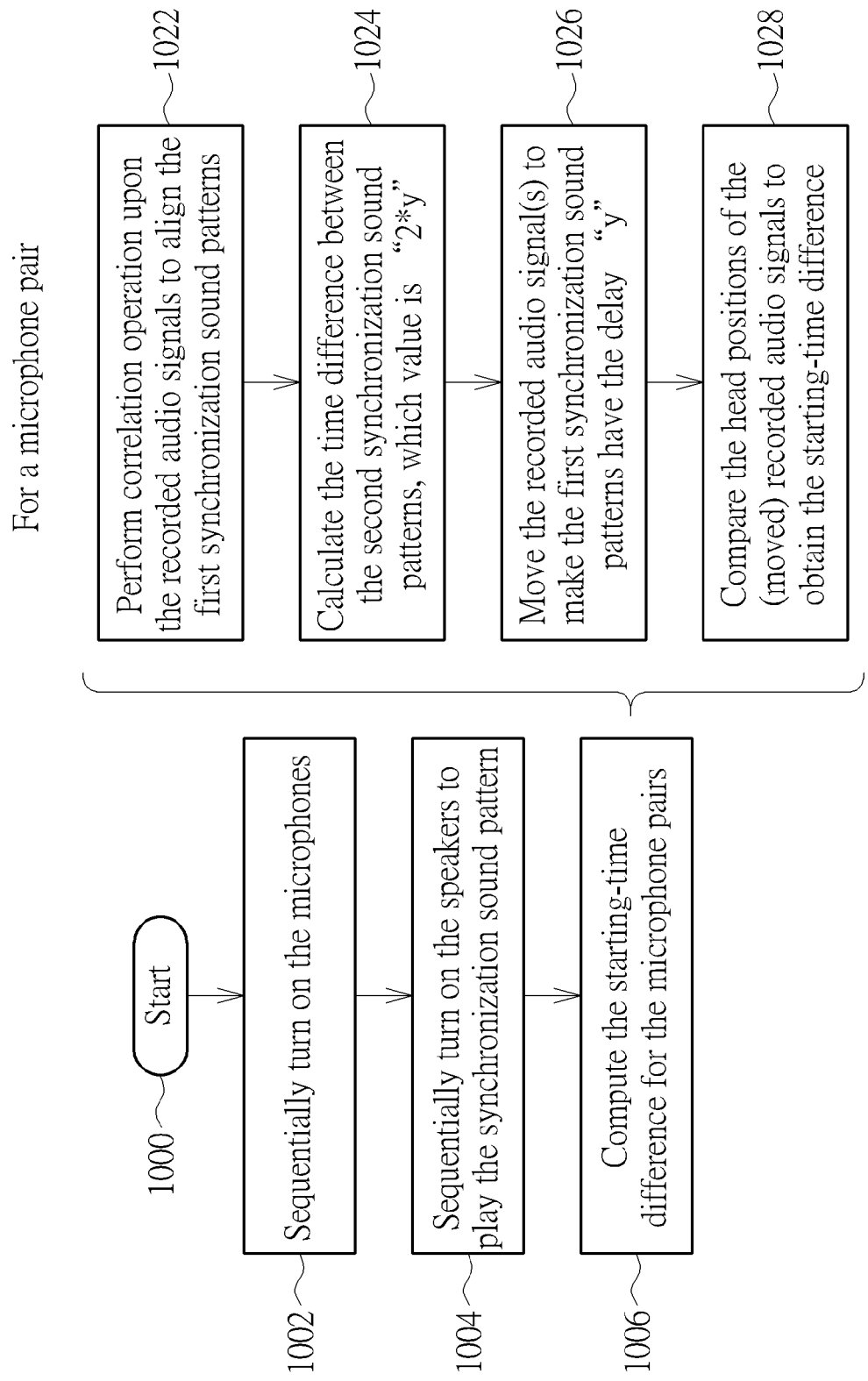
FIG. 10 is a flowchart of an audio synchronization method according to another embodiment of the present invention.

FIG. 10 is a flowchart of an audio synchronization method according to another embodiment of the present invention. In Step 1000, the flow starts. In Step 1002, the electronic device 908 wirelessly controls the electronic devices 802-806 to sequentially turn on the microphones 920_1-920_3. In Step 1004, the electronic device 908 wirelessly controls the speakers 910_1-910_3 to sequentially play the synchronization sound patterns in reverse order. In Step 1006, the processing circuit 930 receives the audio signals from the microphones 920_1-920_3, and computes the starting-time difference for the microphone pairs, for example, the processing circuit 930 computes the starting-time difference between the microphones 920_1 and 920_2, and the starting-time difference between the microphones 920_2 and 920_3.

Steps 1022-1028 are detailed flow of the starting-time difference calculation for a microphone pair. Taking the microphones 920_1 and 920_2 as the example, in Step 1022, the processing circuit 930 performs the correlation operation upon the audio signals recorded by the microphones 920_1 and 920_2 to align the first synchronization sound patterns generated by the speaker 910_1. In Step 1024, after the first synchronization sound patterns are aligned, the processing circuit 930 calculates a time difference between a second synchronization sound pattern of the audio signal recorded by the microphone 920_2 and the second synchronization sound pattern of the audio signal recorded by the microphone 920_1, wherein the second synchronization sound pattern is generated by the speaker 910_2, and a value of the difference is "2*y" (e.g. FIG. 5). In Step 1026, the processing circuit 930 moves the audio signal(s) to make the first synchronization sound pattern of the audio signal recorded by the microphone 920_1 and the first synchronization sound pattern of the audio signal recorded by the microphone 920_2 have the delay "y" (e.g. FIG. 4). In Step 1028, the processing circuit 930 compares a head position of the (moved) audio signal recorded by the microphone 920_1 and a head position of the (moved) audio signal recorded by the microphone 920_2 to obtain the starting-time difference (e.g. "t" shown in FIG. 4) for audio synchronization. For example, the audio signal recorded by the microphone 920_1 or 920_2 (e.g. the one that opens later) may add the dummy patterns whose length is equal to the starting-time difference at the beginning for audio synchronization.

It is noted that the embodiment shown in FIG. 9 may have more than three microphone-speaker pairs, and a plurality of starting-time difference calculations are performed on many two of the microphone-speaker pairs to obtain the starting-time information for all of the microphones. For example, if the system comprises a plurality of speakers 910_1-910_N and a plurality of microphones 920_1-920_N, the starting-time differences for microphones (920_1, 920_2), (920_1, 920_3), (920_1, 920_4), . . . , and (920_1, 920_N) can be calculated, or microphones (920_1, 920_2), (920_2, 920_3), (920_3, 920_4), . . . , and (920_(N−1), 920_N) can be calculated, to obtain the starting-time information for all of the microphones. As long as the starting-time difference calculations form a chain for all of the microphones 920_1-920_N, it is no restriction for the selection of the pair order.

Figure 11:
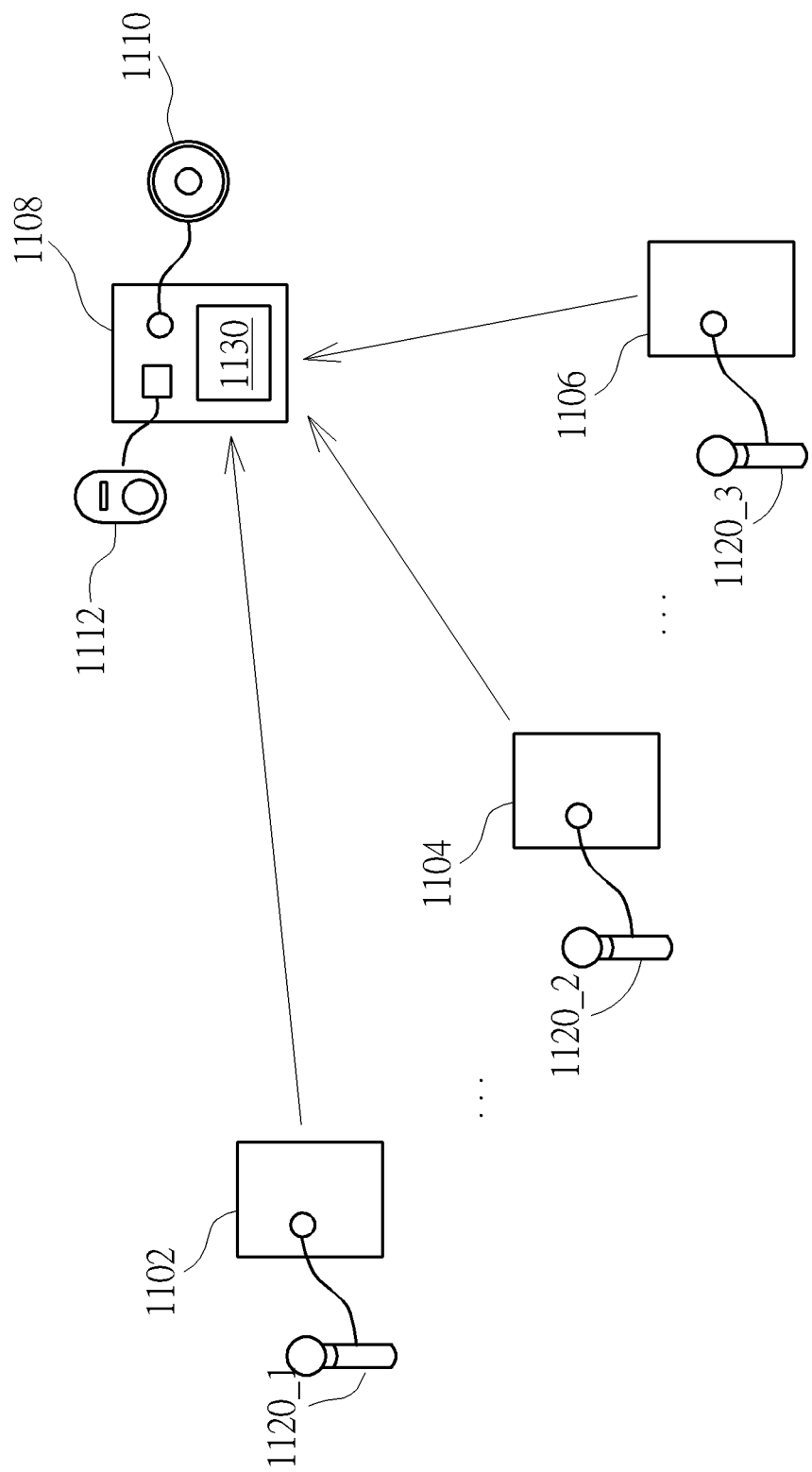
FIG. 11 is a system capable of recording audio signals for 360-degree audio application according to one embodiment of the present invention.

FIG. 11 is a system capable of recording audio signals for 360-degree audio application according to one embodiment of the present invention. As shown in FIG. 11, the system comprises four electronic devices 1102, 1104, 1106 and 1108, where the electronic device 1102 comprises a microphone 1120_1, the electronic device 1104 comprises a microphone 1120_2, the electronic device 1106 comprises a microphone 1120_3, and the electronic device 1108 comprises a control interface 1112, a speaker 1110 and a processing circuit 1130. In addition, the electronic device 1102, 1104 and 1106 can be any portable device such as a smart phone or a tablet capable of recording the audio signals, and the electronic device 1108 can be a remote controller, but it is not a limitation of the present invention.

Figure 12:
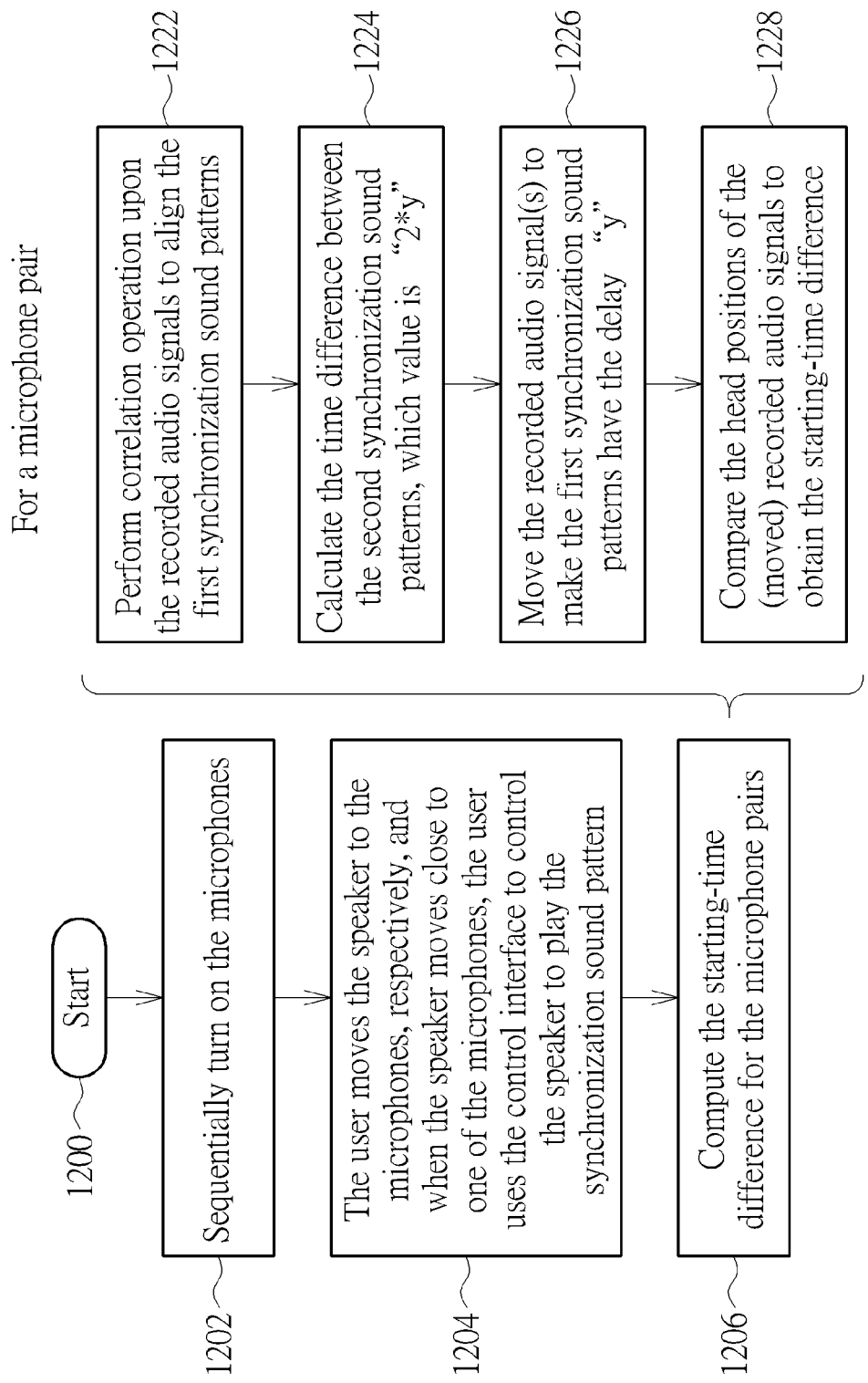
FIG. 12 is a flowchart of an audio synchronization method according to another embodiment of the present invention.

FIG. 12 is a flowchart of an audio synchronization method according to another embodiment of the present invention. In Step 1200, the flow starts. In Step 1202, the electronic device 1108 wirelessly controls the electronic devices 1102-1106 to sequentially turn on the microphones 1120_1-1120_3. In Step 1204, the user moves the electronic device 1108 to the electronic devices 1102-1106, respectively, and when the electronic device 1108 moves close to the electronic devices 1102/1104/1106, the user uses the control interface 1112 to control the speaker 1110 to play the synchronization sound pattern. In detail, the user may move the electronic device 1108 close to the electronic device 1102, and uses the control interface 1112 to control the speaker 1110 to play the synchronization sound pattern; then the user moves the electronic device 1108 close to the electronic device 1104, and uses the control interface 1112 to control the speaker 1110 to play the synchronization sound pattern; and finally the user moves the electronic device 1108 close to the electronic device 1106, and uses the control interface 1112 to control the speaker 1110 to play the synchronization sound pattern. In Step 1206, the processing circuit 1130 receives the audio signals from the electronic devices 1102-1106, and computes the starting-time difference for the microphone pairs, for example, the processing circuit 1130 computes the starting-time difference between the microphones 1120_1 and 1120_2, and the starting-time difference between the microphones 1120_2 and 1120_3.

Steps 1222-1228 are detailed flow of the starting-time difference calculation for a microphone pair. Taking the microphones 1120_1 and 1120_2 as the example, in Step 1222, the processing circuit 1130 performs the correlation operation upon the audio signals recorded by the microphones 1120_1 and 1120_2 to align the first synchronization sound patterns generated by the speaker 1110. In Step 1224, after the first synchronization sound patterns are aligned, the processing circuit 1130 calculates a time difference between a second synchronization sound pattern of the audio signal recorded by the microphone 1120_2 and the second synchronization sound pattern of the audio signal recorded by the microphone 1120_1, wherein the second synchronization sound pattern is generated by the speaker 1110, and a value of the difference is "2*y" (e.g. FIG. 5). In Step 1226, the processing circuit 1130 moves the audio signal(s) to make the first synchronization sound pattern of the audio signal recorded by the microphone 1120_1 and the first synchronization sound pattern of the audio signal recorded by the microphone 1120_2 have the delay "y" (e.g. FIG. 4). In Step 1228, the processing circuit 1130 compares a head position of the (moved) audio signal recorded by the microphone 1120_1 and a head position of the (moved) audio signal recorded by the microphone 1120_2 to obtain the starting-time difference (e.g. "t" shown in FIG. 4) for audio synchronization. For example, the audio signal recorded by the microphone 1120_1 or 1120_2 may add the dummy patterns whose length is equal to the starting-time difference at the beginning for audio synchronization.

Figure 13:
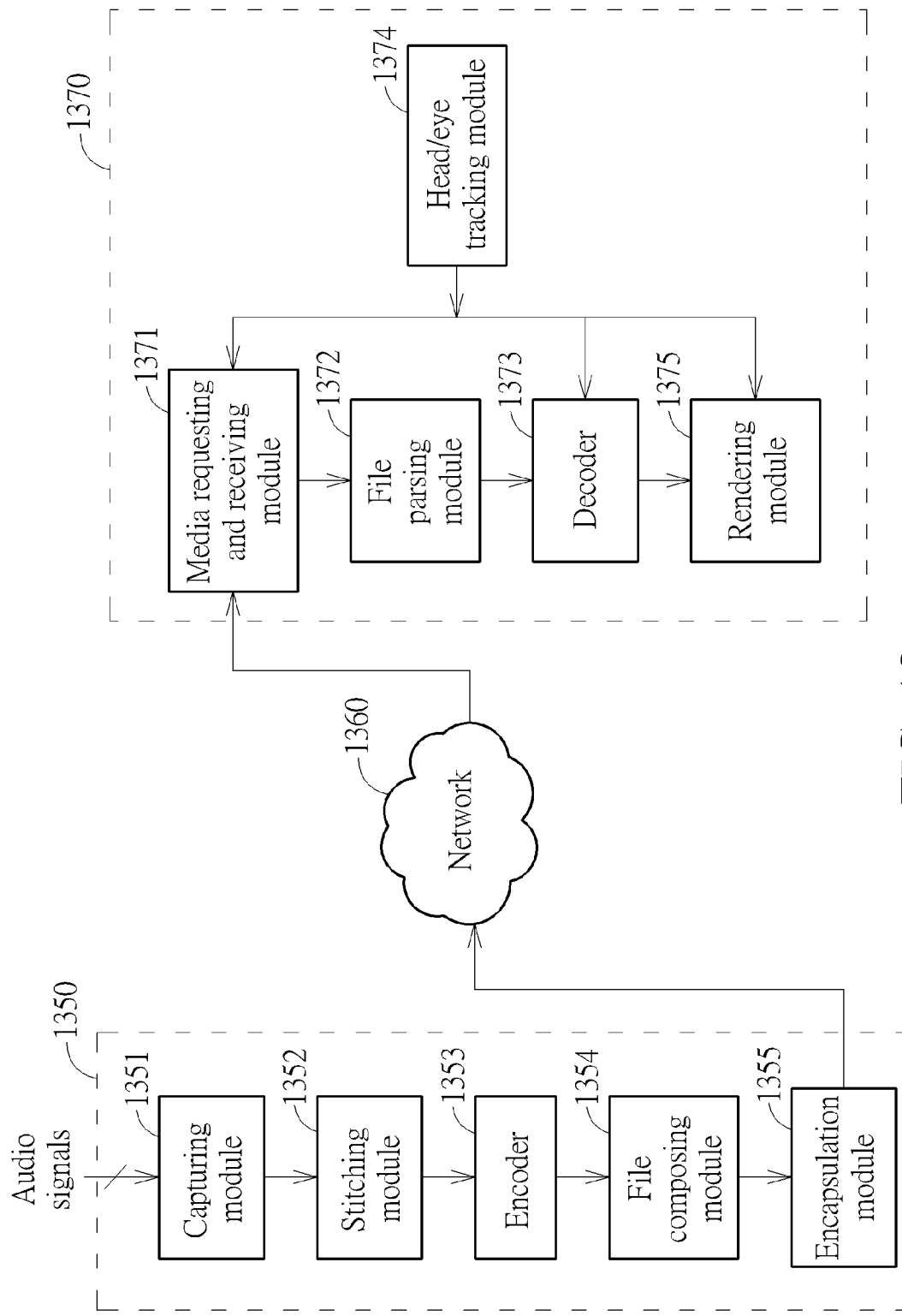
FIG. 13 is a system of the virtual reality application according to one embodiment of the present invention.

The aforementioned embodiments can be applied to virtual reality application to provide a 360-degree audio experience. FIG. 13 is a system of the virtual reality application according to one embodiment of the present invention. As shown in FIG. 13, the system comprises an electronic device 1350 and a head-mounted display 1370, where the electronic device 1350 can be any one of the electronic devices 608, 708, 908, 1108 that is capable of receiving the audio signals recorded by the microphones and providing the synchronized audio signals, and the head-mounted display 1370 is used to receive the synchronized audio signals from the electronic device 1350 via network 1360 and to play the synchronized audio signals for the user.

In detail, the electronic device 1350 comprises a capturing module 1351, a stitching module 1352, an encoder 1353, a file composing module 1354 and an encapsulation module 1355. The capturing module 1351 is used to receive the audio signals from two or more microphones. The stitching module 1352 is used to calculate the starting-time difference between the microphones to compensate/synchronize the audio signals. The encoder 1353 is used to encode the compensated/synchronized audio signals according to related codec standard. The file composing module 1354 converts the encoded audio signals to a media file having a designated format such as ISO base media file format (ISOBMFF). The encapsulation module 1355 is used to perform an encapsulation operation such as a dynamic adaptive streaming over HTTP (DASH) encapsulation upon the media file to generate a media stream.

The head-mounted display 1370 comprises a media requesting and receiving module 1371, a file parsing module 1372, a decoder 1373, a head/eye tracking module 1374 and a rendering module 1375. The media requesting and receiving module 1371 is used to receive the media stream from the electronic device 1350 via the network 1360 according to the user's head/eye tracking information generated by the head/eye tracking module 1374. The file parsing module 1372 is corresponding to the file composing module 1354, and is used to parse the media file to generate the encoded audio signals. The decoder 1373 is used to decode the encoded audio signals provided by the file parsing module 1372 according to the user's head/eye tracking information generated by the head/eye tracking module 1374. Finally, the rendering module 1375 receives the decoded audio signals from the decoder 1373 to play the audio signals for the user according to the user's head/eye tracking information generated by the head/eye tracking module 1374.

In addition, in the embodiment shown in FIG. 13, some elements within the electronic device 1350 may belong to another electronic device. For example, the electronic device 1350 may comprise the capturing module 1351 and the stitching module 1352 only, and the remaining elements such as the encoder 1353, the file composing module 1354 and the encapsulation module 1355 are within another electronic device coupled to the electronic device 1350; or the electronic device 1350 may comprise the capturing module 1351, the stitching module 1352 and the encoder 1353 only, and the remaining elements are within another electronic device; or the electronic device 1350 may comprise the capturing module 1351, the stitching module 1352, the encoder 1353 and the file composing module 1354 only, and the encapsulation module 1355 is within another electronic device. These alternative designs shall fall within the scope of the present invention.

In the embodiment shown in FIG. 13, the user's head/eye tracking information generated by the head/eye tracking module 1374 is provided to the media requesting and receiving module 1371 and the decoder 1373 to improve their working efficiency, that is the media requesting and receiving module 1371 and the decoder 1373 can only select the required data for processing. In other embodiments, the user's head/eye tracking information generated by the head/eye tracking module 1374 may be not provided to the media requesting and receiving module 1371 and/or the decoder 1373. These alternative designs shall fall within the scope of the present invention.

Figure 14:
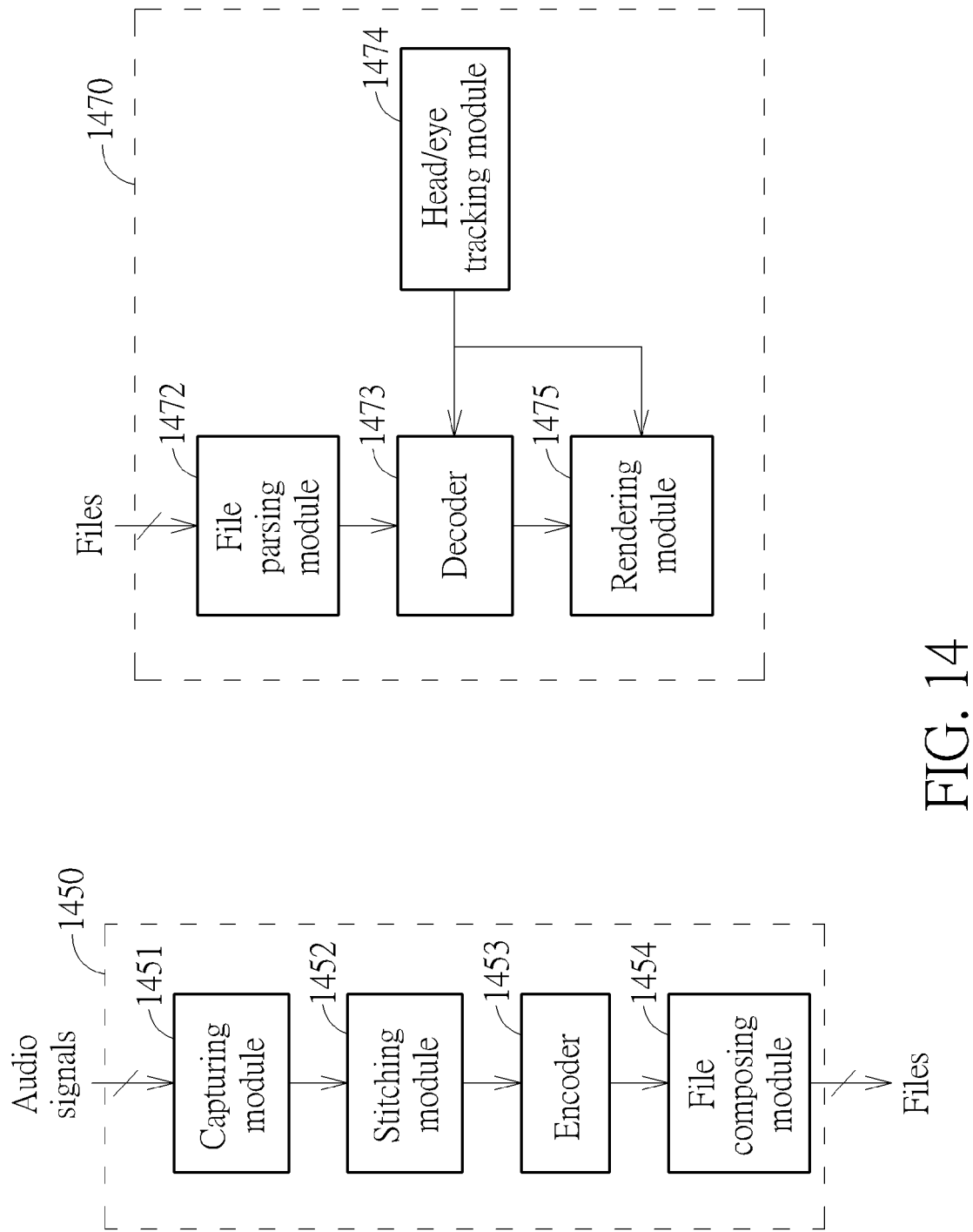
FIG. 14 is a system of the virtual reality application according to another embodiment of the present invention.

FIG. 14 is a system of the virtual reality application according to another embodiment of the present invention. As shown in FIG. 14, the system comprises an electronic device 1450 and a head-mounted display 1470, where the electronic device 1450 can be any one of the electronic devices 608, 708, 908, 1108 that is capable of receiving the audio signals recorded by the microphones and providing the synchronized audio signals, and the head-mounted display 1470 is used to play the synchronized video/audio signals files generated from the electronic device 1450 for the user.

In detail, the electronic device 1450 comprises a capturing module 1451, a stitching module 1452, an encoder 1453 and a file composing module 1454. The capturing module 1451 is used to receive the audio signals from two or more microphones. The stitching module 1452 is used to calculate the starting-time difference between the microphones to compensate/synchronize the audio signals. The encoder 1453 is used to encode the compensated/synchronized audio signals according to related codec standard. The file composing module 1454 converts the encoded audio signals to a media file having a designated format such as ISO base media file format (ISOBMFF). Finally the files generated by the electronic device 1450 are stored in a storage device or a cloud server.

The head-mounted display 1470 comprises a file parsing module 1472, a decoder 1473, a head/eye tracking module 1474 and a rendering module 1475. When the user wants the virtual reality, the file parsing module 1472 is used to receive the media files from the storage device or the cloud server, and to parse the media file to generate the encoded audio signals. The decoder 1473 is used to decode the encoded audio signals provided by the file parsing module 1472 according to the user's head/eye tracking information generated by the head/eye tracking module 1474. Finally, the rendering module 1475 receives the decoded audio signals from the decoder 1473 to play the audio signals for the user according to the user's head/eye tracking information generated by the head/eye tracking module 1474.

In addition, in the embodiment shown in FIG. 14, some elements within the electronic device 1450 may belong to another electronic device. For example, the electronic device 1450 may comprise the capturing module 1451 and the stitching module 1452 only, and the remaining elements such as the encoder 1453 and the file composing module 1454 are within another electronic device coupled to the electronic device 1450; or the electronic device 1450 may comprise the capturing module 1451, the stitching module 1452 and the encoder 1453 only, and the remaining elements are within another electronic device. These alternative designs shall fall within the scope of the present invention.

In the embodiment shown in FIG. 14, the user's head/eye tracking information generated by the head/eye tracking module 1474 is provided to the decoder 1473 to improve the working efficiency, that is the decoder 1473 can only select the required data for processing. In other embodiments, the user's head/eye tracking information generated by the head/eye tracking module 1474 may be not provided to the decoder 1473. These alternative designs shall fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An audio synchronization method, comprising:
    receiving a first audio signal from a first recording device;
    receiving a second audio signal from a second recording device;
    performing a correlation operation upon the first audio signal and the second audio signal to align a first pattern of the first audio signal and the first pattern of the second audio signal;
    after the first patterns of the first audio signal and the second audio signal are aligned, calculating a difference between a second pattern of the first audio signal and the second pattern of the second audio signal; and
    obtaining a starting-time difference between the first audio signal and the second audio signal for audio synchronization according to the difference between the second pattern of the first audio signal and the second pattern of the second audio signal;
    wherein the step of obtaining the starting-time difference between the first audio signal and the second audio signal for audio synchronization according to the difference between the second pattern of the first audio signal and the second pattern of the second audio signal comprises:
        moving the first audio signal and/or the second audio signal to make the first patterns of the first audio signal and the second audio signal have a specific delay, wherein the specific delay is half of the difference between the second pattern of the first audio signal and the second pattern of the second audio signal; and
        comparing a head position of the first audio signal and a head position of the second audio signal to obtain the starting-time difference between the first audio signal and the second audio signal.

2. The audio synchronization method of claim 1, wherein the first patterns of the first audio signal and the second audio signal are from a first speaker, and the second patterns of the first audio signal and the second audio signal are from a second speaker.

3. The audio synchronization method of claim 2, wherein the first speaker, the second speaker, the first recording device and the second recording device are aligned at a same line.

4. The audio synchronization method of claim 3, wherein the first recording device and the second recording device are placed between the first speaker and the second speaker, the first speaker is placed closer to the first recording device than it is to the second recording device, and the second speaker is placed closer to the second recording device than it is to the first recording device.

5. The audio synchronization method of claim 2, wherein the method is executed by a processor within an electronic device, and the first speaker, the second speaker, the first recording device and the second recording device are within the electronic device.

6. The audio synchronization method of claim 2, wherein the method is executed by a processor within an electronic device, and the electronic device wirelessly receives the first audio signal and the second audio signal from the first recording device and the second recording device, respectively.

7. An audio synchronization method, comprising:
    receiving a first audio signal from a first recording device;
    receiving a second audio signal from a second recording device;
    performing a correlation operation upon the first audio signal and the second audio signal to align a first pattern of the first audio signal and the first pattern of the second audio signal;
    after the first patterns of the first audio signal and the second audio signal are aligned, calculating a difference between a second pattern of the first audio signal and the second pattern of the second audio signal; and
    obtaining a starting-time difference between the first audio signal and the second audio signal for audio synchronization according to the difference between the second pattern of the first audio signal and the second pattern of the second audio signal;
    wherein the method is for 360-degree audio synchronization in 360-degree video application, and the method further comprises:
        synchronizing the first audio signal and the second audio signal by using the obtained starting-time difference; and
        wirelessly transmitting the synchronized first audio signal and the synchronized second audio signal to an electronic device for providing virtual reality.

8. An audio synchronization method for 360-degree audio synchronization in 360-degree video application, comprising:
- controlling a first speaker to play a sound having a first pattern;
- controlling a second speaker to play a sound having a second pattern;
- receiving a first audio signal from a first recording device that records the sounds generated by the first speaker and the second speaker;
- receiving a second audio signal from a second recording device that records the sounds generated by the first speaker and the second speaker;
- referring to time points of the first pattern and the second pattern within the first audio signal and time points of the first pattern and the second pattern within the second audio signal to obtain a starting-time difference between the first audio signal and the second audio signal for audio synchronization;
- synchronizing the first audio signal and the second audio signal by using the obtained starting-time difference; and
- wirelessly transmitting the synchronized first audio signal and the synchronized second audio signal to an electronic device for providing virtual reality.

9. The audio synchronization method of claim 8, wherein the first speaker, the second speaker, the first recording device and the second recording device are aligned at a same line.

10. The audio synchronization method of claim 9, wherein the first recording device and the second recording device are placed between the first speaker and the second speaker, the first speaker is placed closer to the first recording device than it is to the second recording device, and the second speaker is placed closer to the second recording device than it is to the first recording device.

11. The audio synchronization method of claim 8, wherein the method is executed by a processor within an electronic device, and the first speaker, the second speaker, the first recording device and the second recording device are within the electronic device.

12. The audio synchronization method of claim 8, wherein the method is executed by a processor within an electronic device, and the electronic device wirelessly receives the first audio signal and the second audio signal from the first recording device and the second recording device, respectively.

13. The audio synchronization method of claim 8, further comprising:
- controlling other K speakers to play sounds having K patterns, respectively, wherein K is a positive integer;
- receiving K audio signals respectively from K recording devices that records the sounds generated by the K speakers; and
- referring to time points of the first pattern, the second pattern and the K patterns within the first audio signal, the second audio signal and the K audio signals to obtain starting-time differences between the first audio signal, the second audio signal and the K audio signals for audio synchronization.

14. An electronic device, comprising:
- a processing circuit, for receiving a first audio signal and a second audio signal from a first recording device and a second recording device, respectively, and performing a correlation operation upon the first audio signal and the second audio signal to align a first pattern of the first audio signal and the first pattern of the second audio signal; and after the first patterns of the first audio signal and the second audio signal are aligned, calculating a difference between a second pattern of the first audio signal and the second pattern of the second audio signal; and obtaining a starting-time difference between the first audio signal and the second audio signal for audio synchronization according to the difference between the second pattern of the first audio signal and the second pattern of the second audio signal;
- wherein the processing circuit moves the first audio signal and/or the second audio signal to make the first patterns of the first audio signal and the second audio signal have a specific delay, wherein the specific delay is half of the difference between the second pattern of the first audio signal and the second pattern of the second audio signal; and the processing circuit further compares a head position of the first audio signal and a head position of the second audio signal to obtain the starting-time difference between the first audio signal and the second audio signal.

15. The electronic device of claim 14, wherein the first patterns of the first audio signal and the second audio signal are from a first speaker, and the second patterns of the first audio signal and the second audio signal are from a second speaker.

16. The electronic device of claim 15, wherein the first speaker, the second speaker, the first recording device and the second recording device are aligned at a same line.

17. The electronic device of claim 16, wherein the first recording device and the second recording device are placed between the first speaker and the second speaker, the first speaker is placed closer to the first recording device than it is to the second recording device, and the second speaker is placed closer to the second recording device than it is to the first recording device.

* * * * *